(12) United States Patent
Graham et al.

(10) Patent No.: US 6,995,825 B2
(45) Date of Patent: Feb. 7, 2006

(54) PROCESS FOR PREPARING FILMS OF POLYMERIZED LIQUID CRYSTAL MATERIAL HAVING A FIRST FILM OF A POLYMERIZED LIQUID CRYSTAL MATERIAL WITH UNIFORM ORIENTATION AND A SECOND FILM OF A POLYMERIZED LIQUID CRYSTAL MATERIAL WITH UNIFORM ORIENTATION DIRECTLY ON THE FIRST FILM

(75) Inventors: Donald Gordon Graham, Dorset (GB); Owain Llyr Parri, Dorset (GB)

(73) Assignee: Merck Patent GmbH, Darmstadt (DE)

( * ) Notice: Subject to any disclaimer, the term of this patent is extended or adjusted under 35 U.S.C. 154(b) by 12 days.

(21) Appl. No.: 10/607,484

(22) Filed: Jun. 27, 2003

(65) Prior Publication Data
US 2004/0263736 A1    Dec. 30, 2004

(30) Foreign Application Priority Data
Jun. 27, 2002    (EP)    ................................ 02014013

(51) Int. Cl.
  *G02F 1/1337* (2006.01)
  *G02F 1/1335* (2006.01)
  *C09K 19/02* (2006.01)
  *C09K 19/52* (2006.01)
(52) U.S. Cl. .................. 349/127; 349/117; 349/128; 349/130; 349/183; 252/299.01
(58) Field of Classification Search .............. 349/115, 349/183, 175, 133, 123–130, 117–121; 252/299.01–299.7; 428/1.1–1.2
See application file for complete search history.

(56) References Cited

U.S. PATENT DOCUMENTS

| | | | | |
|---|---|---|---|---|
| 4,112,157 A | * | 9/1978 | Krueger et al. | ............ 428/1.21 |
| 5,619,352 A | * | 4/1997 | Koch et al. | ................... 349/89 |
| 5,995,184 A | * | 11/1999 | Chung et al. | ............... 349/118 |
| 6,099,758 A | * | 8/2000 | Verrall et al. | ............... 252/585 |
| 6,421,107 B1 | * | 7/2002 | Greenfield et al. | ......... 349/115 |
| 6,641,874 B2 | * | 11/2003 | Kuntz et al. | .................. 428/29 |
| 6,667,793 B2 | * | 12/2003 | Goulding et al. | ........... 349/183 |
| 6,803,985 B2 | * | 10/2004 | Kawamoto et al. | ......... 349/187 |
| 6,816,218 B1 | * | 11/2004 | Coates et al. | ............... 349/123 |
| 2001/0022998 A1 | * | 9/2001 | Verrall et al. | .............. 428/1.32 |
| 2003/0045596 A1 | * | 3/2003 | Krohn | .......................... 522/71 |
| 2004/0095532 A1 | * | 5/2004 | Parri et al. | ................... 349/117 |
| 2004/0135962 A1 | * | 7/2004 | Kuntz et al. | ................ 349/183 |

* cited by examiner

Primary Examiner—Tarifur R. Chowdhury
(74) Attorney, Agent, or Firm—Millen, White, Zelano, Branigan, P.C.

(57) ABSTRACT

The invention relates to a process of preparing films and multilayers comprising polymerized liquid crystal material with uniform orientation, to films and multilayers obtained by said process and their use for optical and electrooptical applications.

22 Claims, 3 Drawing Sheets

PROCESS FOR PREPARING FILMS OF POLYMERIZED LIQUID CRYSTAL MATERIAL HAVING A FIRST FILM OF A POLYMERIZED LIQUID CRYSTAL MATERIAL WITH UNIFORM ORIENTATION AND A SECOND FILM OF A POLYMERIZED LIQUID CRYSTAL MATERIAL WITH UNIFORM ORIENTATION DIRECTLY ON THE FIRST FILM

FIELD OF THE INVENTION

The invention relates to a process of preparing films and multilayers comprising polymerized liquid crystal material with uniform orientation, to films and multilayers obtained by said process and their use for optical and electrooptical applications.

DEFINITION OF TERMS

In connection with films as described in the present application, the following definitions of terms as used throughout this application are given.

The term 'film' as used in this application includes self-supporting, i.e. free-standing, films that show more or less pronounced mechanical stability and flexibility, as well as coatings or layers on a supporting substrate or between two substrates.

The term 'liquid crystal or mesogenic material' or 'liquid crystal or mesogenic compound' should denote materials or compounds comprising one or more rod-shaped, board-shaped or disk-shaped mesogenic groups, i.e. groups with the ability to induce liquid crystal phase behavior. Liquid crystal compounds with rod-shaped or board-shaped groups are also known in the art as 'calamitic' liquid crystals. Liquid crystal compounds with a disk-shaped group are also known in the art as 'discotic' liquid crystals. The compounds or materials comprising mesogenic groups do not necessarily have to exhibit a liquid crystal phase themselves. It is also possible that they show liquid crystal phase behavior only in mixtures with other compounds, or when the mesogenic compounds or materials, or the mixtures thereof, are polymerized.

For the sake of simplicity, the term 'liquid crystal material' is used hereinafter for both liquid crystal materials and mesogenic materials, and the term 'mesogen' is used for the mesogenic groups of the material.

The term 'director' is known in prior art and means the preferred orientation direction of the long molecular axes (in case of calamitic compounds) or short molecular axis (in case of discotic compounds) of the mesogens in a liquid crystal material.

The term 'planar structure' or 'planar orientation' refers to a film wherein the optical axis is substantially parallel to the film plane.

The term 'homeotropic structure' or 'homeotropic orientation' refers to a film wherein the optical axis is substantially perpendicular to the film plane, i.e. substantially parallel to the film normal.

The terms 'tilted structure' or 'tilted orientation' refer to a film wherein the optical axis is tilted at an angle $\theta$ between 0 and 90 degrees relative to the film plane.

The term 'splayed structure' or 'splayed orientation' means a tilted orientation as defined above, wherein the tilt angle additionally varies monotonously in the range from 0 to 90°, preferably from a minimum to a maximum value, in a direction perpendicular to the film plane.

In planar, homeotropic and tilted optical films comprising uniaxially positive birefringent liquid crystal material with uniform orientation, the optical axis of the film is given by the director of the liquid crystal material.

The term 'helically twisted structure' relates to a film comprising one or more layers of liquid crystal material wherein the mesogens are oriented with their main molecular axis in a preferred direction within molecular sublayers, said preferred orientation direction in different sublayers being twisted at an angle $\Phi$ around a helix axis. The term 'helically twisted structure with planar orientation' means a film with helically twisted structure as described above, wherein the helix axis is substantially perpendicular to the film plane, i.e. substantially parallel to the film normal.

BACKGROUND OF THE INVENTION

Anisotropic films comprising polymerized liquid crystal (LC) material with uniform orientation are known in prior art. They are typically used as retardation, compensation or polarization films for LC displays or other optical or electrooptical applications. Planar LC films are described for example in WO 98/04651. Homeotropic LC films are described for example in WO 98/00475 and GB 2 324 382 A. Tilted or splayed LC films are described for example in U.S. Pat. No. 5,619,352, WO 97/44409, WO 97/44702, WO 97/44703 and WO 98/12584.

For many applications, e.g., in liquid crystal displays, it is necessary to use as an optical component a stack or multilayer of two or more LC films having the same or different orientation. For this purpose, usually macroscopically aligned LC films are supported on a plastic substrate and are manufactured on a roll to roll coating machine. The polymerized LC films produced are then laminated, e.g., to other LC films or to polarizers.

The lamination process typically involves applying a pressure sensitive adhesive (PSA) sheet to the film, attaching it to the desired component, and then removing the original plastic substrate. If the LC film is to be used with another LC film this must be similarly removed from its supporting substrate. Each lamination stage is both labor and material consumptive. Also, the use of PSA sheets increases the material costs and the thickness of the final multilayer, which is often undesired for use in flat panel displays.

Also, in case of homeotropic films for example often an aluminized plastic substrate is used to induce homeotropic alignment, as described for example in GB 2 324 382 A. In this case, due to the poor adhesion of the aluminum to the surface of the plastic substrate delamination can remove some of the aluminum, leading to an increased defect rate. Also, the homeotropic films thus produced sometimes show a reduced mechanical stability. For example, when a homeotropic LC film thus produced was tested for durability in an environment chamber, it showed a tendency to crack when laminated to other films.

SUMMARY OF THE INVENTION

An aim of the present invention is to provide a process for preparing anisotropic films comprising polymerized LC material that do not have the drawbacks of known films and allow easy and economic fabrication even at large scales.

Another aim of the present invention is to provide polymerized LC films that are easy to manufacture, show improved mechanical stability, in particular a reduced tendency to crack when laminated to other films, and have good optical performance when used in LC displays.

Another aim of the present invention is to provide an improved process for preparing a stack of more than one polymerized LC film having the same or different orientation, which is less labor and material consumptive than the methods known from prior art, and allows a reduction of the number of process steps and components required.

Other aims of the present invention would be evident to the person skilled in the art from the following detailed description.

The above aims way be achieved by providing processes, films and multilayers of films according to the present invention.

In particular, the inventors have found that the above aims can be achieved by a process where a film of polymerized LC material is directly prepared on another aligned liquid crystal layer that serves as substrate. The benefits of this process are, e.g., the reduction of the amount of plastic substrate used and in particular the reduction of the number of lamination steps required. This leads to a reduction in processing costs.

A further aspect of the invention relates to a method of improving the mechanical stability of a film comprising polymerized LC material, in particular a method of reducing the number of cracks when the film is subjected to mechanical stress, e.g., when laminated to other films, by reducing the degree of crosslinking in the polymerizable material that is used for preparing the film. The inventors have found that the film stability increases and the number of cracks decreases when the amount of multireactive compounds (compounds with two or more polymerizable groups) in the polymerizable LC material is reduced. However, a certain amount of multireactive compounds in the polymerizable mixture is necessary to obtain a stable, self-supporting film.

A further aspect of the invention relates to a method of controlling the tilt angle in a second polymerized LC film with homeotropic or tilted orientation, which is prepared by UV photocuring of a polymerizable LC material on a first polymerized LC film with planar orientation serving as substrate, wherein said first, planar LC film is also prepared by UV photocuring of a polymerizable liquid crystal material. The inventors found that the tilt angle in the second LC film can be varied from 0° (homeotropic) to higher values (tilted) by reducing the UV intensity used for photocuring of said first LC film.

The invention includes a process of preparing a second film comprising a second polymerized liquid crystal (LC) material with uniform orientation directly onto a first film comprising a first polymerized LC material with uniform orientation, by providing said second polymerizable LC material directly onto said first film and polymerizing said second LC material.

The invention further relates to a process of preparing a second film comprising a second polymerized LC material with homeotropic, tilted or splayed orientation, by providing a second polymerizable LC material onto a first film of polymerized LC material having planar orientation and polymerizing it.

Preferably, said first film having planar orientation is prepared by providing a first polymerizable LC material onto a substrate, aligning it into planar orientation and polymerizing it by exposure to UV radiation, Further preferably, the tilt angle in said second film having homeotropic, tilted or splayed orientation is controlled by varying the intensity of UV radiation used for polymerization of said first film having planar orientation.

The invention further relates to a process of preparing a second film comprising a second polymerized LC material with homeotropic, tilted or splayed orientation and having improved mechanical stability, by providing a second polymerizable LC material onto a first film of a first polymerized LC material having planar orientation and optionally having a helically twisted structure, and polymerizing said second LC material, wherein said second polymerizable LC material comprises one or more polymerizable compounds having one polymerizable group (monoreactive) and one or more polymerizable compounds having two or more polymerizable groups (multireactive), characterized in that the mechanical stability of said second film is controlled by varying the amount of multireactive compounds in said second polymerizable LC material.

The invention further relates to a film comprising polymerized LC material with homeotropic, tilted or splayed orientation, obtainable by a process as described above and below.

The invention further relates to a multilayer film comprising at least one second film comprising a second polymerized LC material with uniform orientation that is directly adjacent to at least one first film comprising a first polymerized LC material with uniform orientation, obtainable by a process as described above and below.

The invention further relates to the use of a film or multilayer film as described above and below in optical or electrooptical devices.

The invention further relates to a liquid crystal display comprising a film or multilayer film as described above and below.

DETAILED DESCRIPTION OF THE INVENTION

Unless stated otherwise, the general preparation of polymerized LC films in this invention is carried out according to standard methods known from the literature. Typically a polymerizable LC material is coated or otherwise applied onto a substrate where it aligns into uniform orientation, and polymerized in situ in its LC phase, e.g., by exposure to heat or actinic radiation, preferably by photo-polymerization, very preferably by UV-photopolymerization, thereby fixing the alignment of the LC molecules. Uniform alignment can also be induced or enhanced by additional means like shearing, surface treatment of the substrate, or addition of surfactants to the LC material.

The preparation of planar LC films according to this procedure is described, e.g., in WO 98/04651, the preparation of homeotropic LC films is described, e.g., in WO 98/00475, the preparation of tilted or splayed LC films is described, e.g., in U.S. Pat. No. 5,619,352, WO 97/44702 and WO 98/12584, with the entire disclosure of all these documents being incorporated into this application by reference.

If a helically twisted LC film with planar orientation is used, this is preferably a film comprising polymerized chiral LC, in particular cholesteric LC (CLC) material with a short pitch and a reflection in the UV range, which is also known in the literature as "UVCLC" film or "highly twisted A plate" as described for example in GB 2,315,072 and WO 01/20394, the entire disclosures of which are incorporated into this application by reference.

A first preferred embodiment of the present invention relates to a method of preparing a second film comprising second polymerized LC material with uniform orientation directly on a first film comprising first polymerized LC material with uniform orientation that serves as a substrate.

The second polymerized LC film is prepared as described above by providing a second polymerizable LC material onto a substrate and polymerizing the material in situ. Preferably, a first polymerized LC film having planar orientation is used as substrate.

Said first LC film having planar orientation is prepared, e.g., by providing a first polymerizable LC material onto a substrate, aligning it into planar orientation and polymerizing it by exposure to UV radiation, according to standard procedures that are known to the expert and are described in the literature.

The inventors have found that a second polymerizable LC mixture provided on said first, planar polymerized LC film aligns homeotropically and can be cured to form a second polymerized LC film. As a result, the polymerized LC material in the second film has homeotropic, tilted or splayed orientation. The orientation can further be controlled as described in the second preferred embodiment below.

Very preferred are embodiments where the polymerized LC material in
said first film has planar orientation.
said first film has helically twisted structure and planar orientation.
said second film has homeotropic orientation.
said second film has tilted or splayed orientation.

The following combinations are especially preferred:

The polymerized LC material in the second film has homeotropic orientation and in the first film has planar orientation.

The polymerized LC material in the second film has homeotropic orientation and in the first film has helically twisted structure with planar orientation.

The polymerized LC material in the second film has tilted or splayed orientation and in the first film has planar orientation.

The splayed film preferably has a largely continuous tilt profile, with the tilt angle preferably varying in the range from 0° to 90°, especially preferably from between 0° and 5° to between 85° and 90°. The on-axis retardation (i.e. at 0° viewing angle) of a splayed film is preferably from 50 nm to 150 nm, especially preferably from 70 nm and 120 nm. These values are for the splayed film measured separately from the planar film.

The planar film preferably has a thickness of from 0.5 to 2 microns, especially preferably from 0.75 to 1.3 microns. The on-axis retardation of the planar film is preferably from 30 nm to 250 nm.

The combined retardation of a bilayer film is the additive of the retardation of the two individual films.

A second preferred embodiment of the invention relates to a method of controlling the orientation of the LC molecules in a second film comprising a second polymerized LC material, which is prepared on a first film of a first polymerized LC material having planar orientation that serves as a substrate.

The first LC film having planar orientation is prepared, e.g., by providing a first polymerizable LC material onto a substrate, aligning it into planar orientation and polymerizing it by exposure to UV radiation.

The second polymerized LC film is prepared as described above, by providing a second polymerizable LC material on said first, planar film where it aligns homeotropically, and polymerizing said second material.

Homotropical alignment of the second LC film can be controlled by varying the amount of UV radiation that said underlying first, planar LC film serving as substrate had been subjected to during its preparation.

For example, if a first planar LC film is used as substrate that was prepared by UV photopolymerization of a planar aligned first LC mixture with insufficient UV intensity, a second polymerizable LC mixture coated on said planar film does not show good homeotropic alignment.

Good homeotropic alignment can be achieved if the first film is exposed to UV light of sufficient intensity.

As a result, there is a minimum amount of UV exposure during preparation of the first planar LC film required, below which no homeotropic alignment is produced in the second LC film. The minimum amount of light intensity needed depends on the polymerizable mixture used. For the preferred mixtures shown below, the amount of light intensity is preferably about 1.1 W/cm$^2$ or higher, however, the invention is not limited to this value.

A third preferred embodiment of the invention relates to a method of improving the mechanical stability of a second film comprising second polymerized LC material, which is prepared on a first film of first polymerized LC material having planar orientation that serves as a substrate.

The second polymerized LC film is prepared as described above, by providing a polymerizable LC material on said first, planar film and polymerizing it. The second LC film preferably has homeotropic, tilted or splayed orientation.

The polymerizable LC material used for preparation of said second film preferably comprises at least one polymerizable compound having one polymerizable group (monoreactive) and at least one polymerizable compound having two or more polymerizable groups (multireactive).

According to this embodiment the mechanical stability of said second film is controlled by varying the crosslinking density in the second polymerized LC film.

If multireactive compounds are present in the polymerizable material, a three-dimensional polymer network is formed and the orientation of the LC material is permanently fixed. An optical retardation film made of such a network is self-supporting and shows a high mechanical and thermal stability and a low temperature dependence of its physical and optical properties.

By varying the concentration of the multireactive compounds the crosslink density of the polymer film and thereby its physical and chemical properties such as the glass transition temperature, which is also important for the temperature dependence of the optical properties of the optical retardation film, the thermal and mechanical stability or the solvent resistance can be tuned.

In particular, the inventors found out that by varying the amount of multireactive compounds between a minimum value and a maximum value, it is possible to improve the mechanical stability of the polymerized LC film. In this way, for example, the number of cracks is reduced when the LC film is laminated to another film.

Very preferably the polymerizable LC material comprises one or more multireactive compounds, in particular multireactive mesogenic compounds, in an amount of from 5 to less than 42%, preferably from 5 to 40, very preferably from 5 to 33%, by weight of the total amount of solid components in the material.

Especially preferred are films obtained by the above inventive process that have improved stability against cracking. The polymerizable LC material preferably comprises one or more monoreactive polymerizable mesogenic compounds and one or more di- or multireactive polymerizable mesogenic compounds.

Polymerizable mesogenic mono-, di- and multireactive compounds used for the instant invention can be prepared by methods which are known per se and which are described, for example, in standard works of organic chemistry such as, for example, Houben-Weyl, Methoden der organischen Chemie, Thieme-Verlag, Stuttgart. Typical examples are described for example in WO 93/22397; EP 0 261 712; DE 19504224; DE 440817 and DE 4405316. The compounds disclosed in these documents, however, are to be regarded merely as examples that do not limit the scope of this invention.

Very preferably the liquid crystalline or mesogenic materials, compounds and polymers compounds mentioned above and below are selected from calamitic liquid crystalline or mesogenic materials, which provide good optical performance with improved chromaticity, and, especially in case of monomers, can easily and quickly be aligned into the desired orientation, which is especially important when manufacturing polymer films at large scale.

Examples representing especially useful calamitic mono- and direactive polymerizable mesogenic compounds are shown in the following list of compounds, which should, however, be taken only as illustrative and is in no way intended to restrict, but instead to explain the present invention:

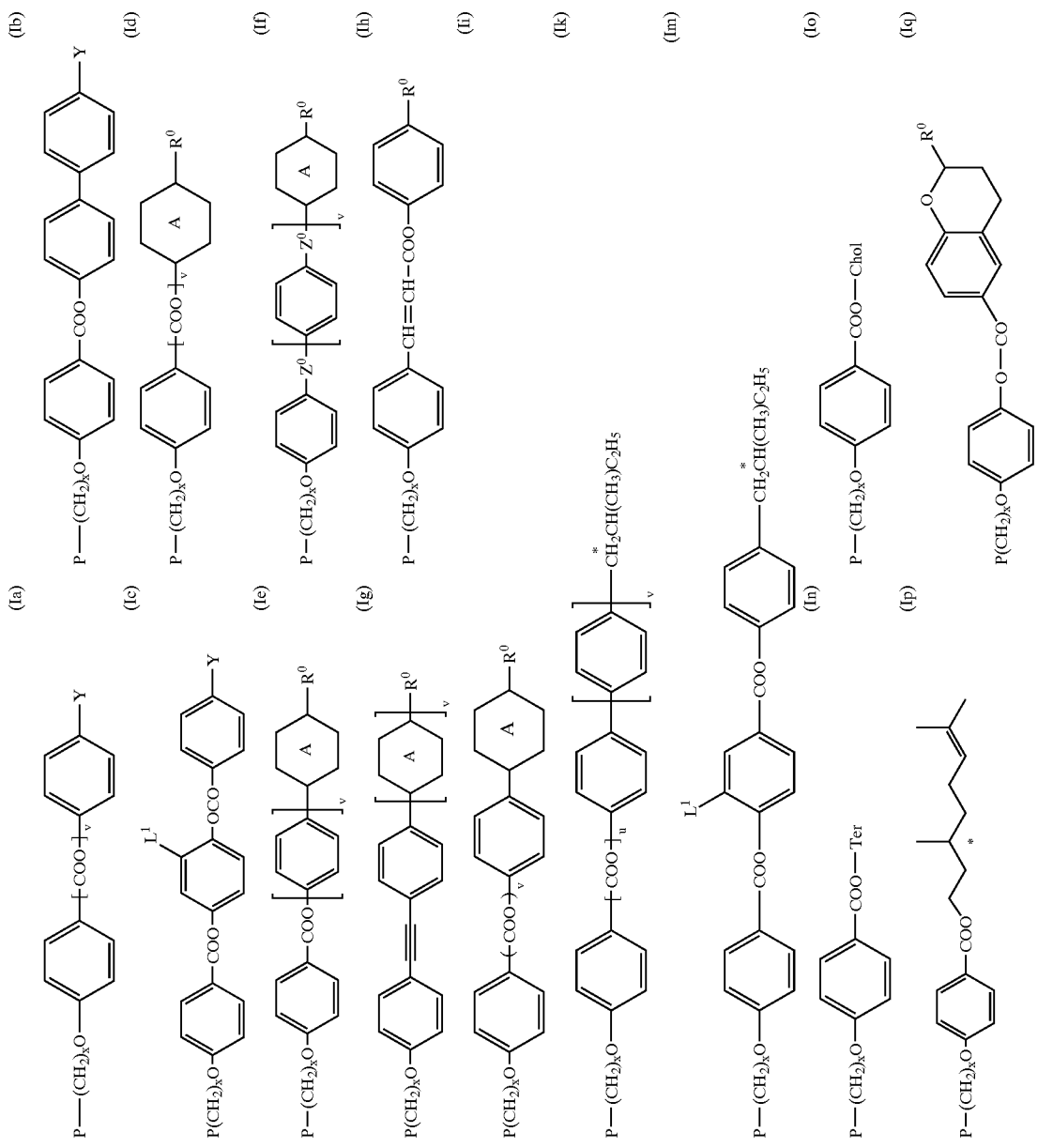

-continued
(IIa) 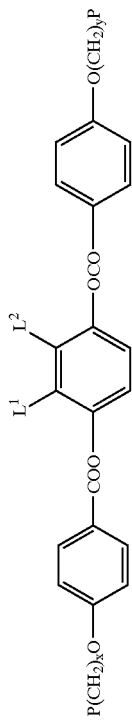
(IIb) 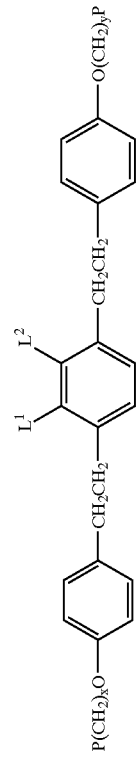
(IIc) 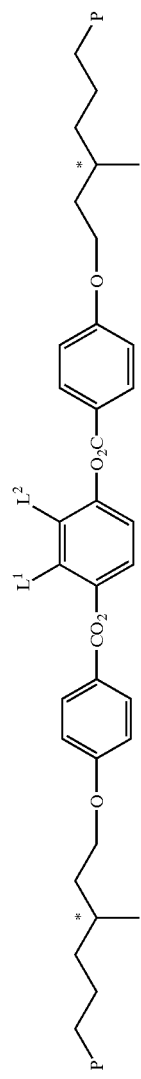
(IId) 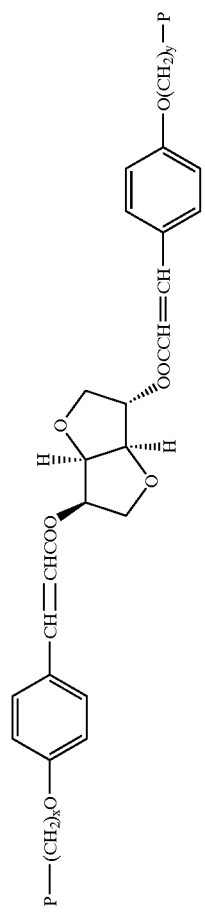
(IIe) 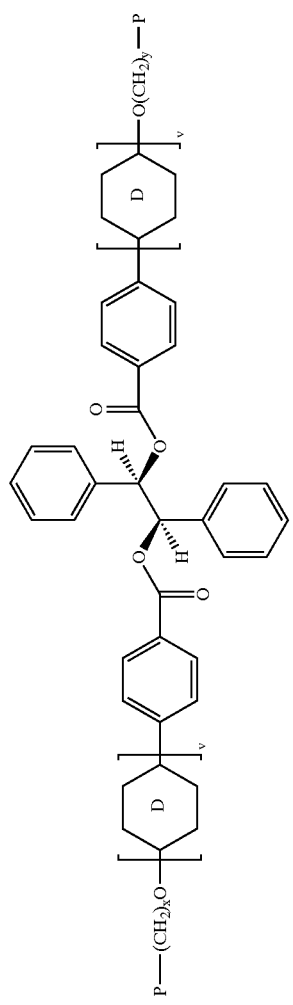

In the above formulae, P is a polymerizable group, preferably an acryl, methacryl, vinyl, vinyloxy, propenyl ether, epoxy or styrene group, x and y are each independently 1 to 12, A and D are 1,4-phenylene that is optionally mono-, di- or trisubstituted by $L^1$ or 1,4-cyclohexylene, u and v are 0 or 1, $Z^0$ is —COO—, —OCO—, —CH$_2$CH$_2$— or a single bond, Y is a polar group, $R^0$ is an unpolar alkyl or alkoxy group, Ter is a terpenoid radical like, e.g., menthyl, Chol is a cholesteryl group, and $L^1$ and $L^2$ are each independently H, F, Cl, CN or an optionally halogenated alkyl, alkoxy, alkylcarbonyl, alkoxycarbonyl or alkoxycarbonyloxy group with 1 to 7 C atoms.

The term 'polar group' in this connection means a group selected from F, Cl, CN, NO$_2$, OH, OCH$_3$, OCN, SCN, an optionally fluorinated carbonyl or carboxyl group with up to 4 C atoms or a mono- oligo- or polyfluorinated alkyl or alkoxy group with 1 to 4 C atoms.

The term 'unpolar group' means an alkyl group with 1 or more, preferably 1 to 12 C atoms or an alkoxy group with 2 or more, preferably 2 to 12 C atoms.

A preferred polymerizable liquid crystal material for the preparation of homeotropic, tilted and splayed films comprises 5–4%, preferably 5–40%, very preferably 5–32% by weight of one or more direactive achiral mesogenic compounds, 49–90% preferably 50–85% by weight of one or more monoreactive achiral mesogenic compounds, and 0.1 to 10% by weight of one or more photoinitiators.

The monoreactive achiral compounds are preferably selected from above formulae Ia–If and Ii, in particular Ia and Ie, wherein v is 1.

The direactive achiral compounds are preferably selected from above formulae IIa and IIb, in particular IIa.

For the preparation of planar films with helically twisted structure, the polymerizable LC material preferably comprises one or more achiral polymerizable mesogenic compounds and at least one chiral compound. The chiral compound can be selected from non-polymerizable chiral compounds, such as, e.g., conventional chiral dopants, polymerizable chiral non-mesogenic or polymerizable chiral mesogenic compounds.

Suitable dopants can be selected, e.g., from the commercially available R or S 811, R or S 1011, R or S 2011 or CB 15 (from Merck KGaA, Darmstadt, Germany). Very preferred are chiral dopants with a high helical twisting power (HTP), in particular dopants comprising a sorbitol group as described in WO 98/00428, dopants comprising a hydrobenzoin group as described in GB 2,328,207, chiral binaphthyl derivatives as described in WO 02/94805, chiral binaphthol acetal derivatives as described in WO 02/34739, chiral TADDOL derivatives as described in WO 02/06265, and chiral compounds having at least one fluorinated linkage group and a terminal or central chiral group as described in WO 02/06196 and WO 02/06195.

The polymerizable material can also be dissolved in a solvent, preferably in an organic solvent. The solution is then coated onto the substrate, for example by spin-coating or other known techniques, and the solvent is evaporated off before polymerization. In most cases it is suitable to heat the mixture in order to facilitate the evaporation of the solvent.

Polymerization of the LC material is preferably achieved by exposing it to actinic radiation. Actinic radiation means irradiation with light, like UV light, IR light or visible light, irradiation with X-rays or gamma rays or irradiation with high energy particles, such as ions or electrons. Preferably polymerization is carried out by photoirradiation, in particular with UV light, very preferably with linear polarized UV light. As a source for actinic radiation for example a single UV lamp or a set of UV lamps can be used. When using a high lamp power the curing time can be reduced. Another possible source for photoradiation is a laser, like, e.g., a UV laser, an IR laser or a visible laser.

Polymerization is carried out in the presence of an initiator absorbing at the wavelength of the actinic radiation. For example, when polymerizing by means of UV light, a photoinitiator can be used that decomposes under UV irradiation to produce free radicals or ions that start the polymerization reaction. UV photoinitiators are preferred, in particular radicalic UV photoinitiators. As standard photoinitiator for radical polymerization for example the commercially available Irgacure® 907, Irgacure® 651, Irgacure® 184, Darocure® 1173 or Darocure® 4205 (all from Ciba Geigy AG) can be used, whereas in case of cationic photopolymerization the commercially available UVI 6974 (Union Carbide) can be used.

The polymerizable LC material can additionally comprise one or more other suitable components such as, for example, catalysts, sensitizers, stabilizers, chain-transfer agents, inhibitors, co-reacting monomers, surface-active compounds, lubricating agents, wetting agents, dispersing agents, hydrophobing agents, adhesive agents, flow improvers, defoaming agents, deaerators, diluents, reactive diluents, auxiliaries, colorants, dyes or pigments.

In another preferred embodiment the mixture of polymerizable material comprises up to 70%, preferably 1 to 50% of a monoreactive non-mesogenic compound with one polymerizable functional group. Typical examples are alkyl acrylates or alkyl methacrylates with alkyl groups of 1 to 20 C atoms.

It is also possible, in order to increase crosslinking of the polymers, to add up to 20% of a non-mesogenic compound with two or more polymerizable functional groups to the polymerizable LC material alternatively or in addition to the di- or multireactive polymerizable mesogenic compounds to increase crosslinking of the polymer. Typical examples for direactive non-mesogenic monomers are alkyl diacrylates or alkyl dimethacrylates with alkyl groups of 1 to 20 C atoms. Typical examples for multireactive non-mesogenic monomers are trimethylpropane trimethacrylate or pentaerythritol tetraacrylate.

It is also possible to add one or more chain transfer agents to the polymerizable material in order to modify the physical properties of the polymer film. Especially preferred are thiol compounds, such as monofunctional thiol compounds like, e.g., dodecane thiol or multifunctional thiol compounds like, e.g., trimethylpropane tri(3-mercaptopropionate), very preferably mesogenic or liquid crystalline thiol compounds. When adding a chain transfer agent, the length of the free polymer chains and/or the length of the polymer chains between two crosslinks in the inventive polymer film can be controlled. When the amount of the chain transfer agent is increased, the polymer chain length in the obtained polymer film is decreasing.

The films according to the present invention can be used as retardation or compensation films in conventional LCDs, in particular those of the DAP (deformation of aligned phases) or VA (vertically aligned) mode, like, e.g., ECB (electrically controlled birefringence), CSH (color super homeotropic), VAN or VAC (vertically aligned nematic or cholesteric) displays, MVA (multi-domain vertically aligned) or PVA (patterned vertically aligned) displays, in displays of the bend mode or hybrid type displays, like, e.g., OCB (optically compensated bend cell or optically compensated birefringence), R-OCB (reflective OCB), HAN (hybrid aligned nematic) or pi-cell (π-cell) displays, furthermore in displays of the TN (twisted nematic), HTN (highly twisted nematic) or STN (super twisted nematic) mode, in AMD-TN (active matrix driven TN) displays, in displays of the IPS (in plane switching) mode which are also known as 'super TFT' displays, or in isotropic mode displays as described for example in WO 02/93244 A1.

Especially preferred are VA, MVA, PVA, OCB and pi-cell displays.

The entire disclosures of all applications, patents and publications, cited herein and of corresponding European application No. 02014013.3, filed Jun. 27, 2002, are incorporated by reference herein.

The examples below serve to illustrate the invention without limiting it. In the foregoing and the following, all temperatures are given in degrees Celsius, and all percentages are by weight, unless stated otherwise.

EXAMPLES

Example 1

Preparation of a Roll to Roll Coated Homeotropically Aligned LC Film on a Planar Aligned LC Film 1A) Preparation of planar LC film
Polymerizable LC mixture 1A was formulated as follows

| | |
|---|---|
| Monoreactive compound (1) | 32.9% |
| Monoreactive compound (2) | 18.8% |
| Direactive compound (3) | 42.2% |
| Irgacure 907 ® | 5.6% |
| Fluorad FC171 ® | 0.5% |

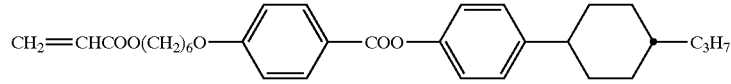

(1)

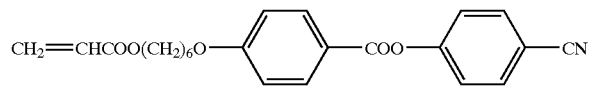

(2)

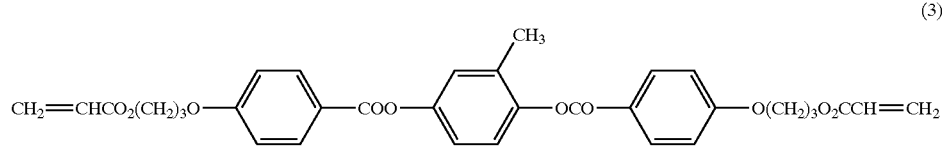

(3)

The monoreactive compound (1) and its preparation are described in GB 2,280,445. The monoreactive compound (2) can be prepared according to or in analogy to the methods described in D. J. Broer et al., Makromol. Chem. 190, 3201–3215 (1989). The direactive compound (3) can be prepared as described in WO 93/22397. Irgacure 907 is a commercially available photoinitiator (from Ciba AG, Basel, Switzerland). Fluorad FC 171 is a commercially available non-ionic fluorocarbon surfactant (from 3M).

A 17.5% solution of mixture 1A dissolved in toluene/cyclohexanone 7:3 was prepared and filtered to 0.2 μm. An RK Koater was webbed with HiFi PET of 100 μm thickness. The substrate was rubbed with a velvet covered rubbing roller set at 1000 rpm. With the web speed set at 3 m/min the coating solution was applied with a 150 lpi trihelical gravure rotating at 3.6 m/min. Solvent was removed with both ovens at 60° C. and the mixture polymerized with the UV lamp at 60% power.

A planar polymerized LC film produced was clear and well aligned with a thickness of 1.2 μm.

The planar film was removed from the PET by lamination onto TAC with PSA so that the film retardation can be measured without interference from the birefringence of the PET. The retardation on axis was 172.2 nm and the profile is shown in FIG. 1.

1B) Preparation of homeotropic LC film
Polymerizable LC mixture 1B was formulated as follows

| | |
|---|---|
| Monoreactive compound (1) | 30.8% |
| Monoreactive compound (2) | 21.8% |
| Direactive compound (3) | 20.1% |
| Monoreactive compound (4) | 21.8% |
| Irgacure 907 ® | 5.5% |

(4)

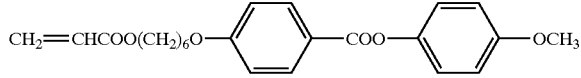

The monoreactive compound (4) can be prepared according to or in analogy to the methods described in D. J. Broer et al., Makromol. Chem. 190, 3201–3215 (1989).

The RK Koater was now set for coating the homeotropic liquid crystal layer. The planar film prepared according to example 1A on the PET was fed through the machine. A 20% solution of mixture 1B dissolved in toluene/cyclohexanone 7:3 was coated onto the planar coating on the web. Machine speeds and conditions were kept the same apart from the following two changes. The trihelical gravure was changed to 90 lpi, and the rubbing roller was removed from the web path.

The process produced a clear well aligned homeotropic coating on top of the planar aligned liquid crystal, with the thickness of the homeotropic layer being approximately 3 μm.

After removal from the PET and lamination to TAC the retardation of the combined film was measured and found to be 182.7 nm on axis. The retardation profile is shown in FIG. 2.

Example 2

Durability of a Homeotropically Aligned LC Film
2A) Homeotropic LC Film Prepared on a Planar LC Film A planar LC film was prepared on the RK Koater in a similar manner to that described in example 1A above, except that the substrate used was TAC. A homeotropically aligned LC layer was applied to this by preparing a 30% solution of mixture 1B in toluene/cyclohexanone and using a No 3 wire wound bar. The coating was cured with 4 passes through a Minicure UV curing system at 20 m/min. The resultant bilayer of homeotropic and planar LC film was transferred to a 50×70×0.15 mm glass slide using PSA. Similar slides were produced with single planar LC film alone and with a single homeotropic LC film prepared as described in example 1. For each type of film two samples (I,II) were prepared. These slides were then placed in an environmental chamber at 60° C. and 80% relative humidity. Assessments of the amount of cracking are shown in table 1 below.

TABLE 1

|  | Time (hours) | | | | | | |
| --- | --- | --- | --- | --- | --- | --- | --- |
|  | 140 h | 332 h | 476 h | 645 h | 812 h | 981 h | 1220 h |
| Homeotropic + planar I | Nil | Nil | Nil | 3 × 3 mm | 3 × 3 mm | 6 × 3 mm | 6 × 3 mm |
| Homeotropic + planar II | Nil | Nil | Nil | 2 × 3 mm | 2 × 3 mm | 3 × 3 mm | 6 × 3 mm<br>2 × 10 mm |
| Homeotropic I | 6 × long[1] | 6 × long | 7 × long | 8 × long | Many long | Many long | Many long |
| Homeotropic II | 8 × long | 8 × long | 8 × long | 10 × long | Many long | Many long | Many long |
| Planar I | Nil | Nil | Nil | Nil | Nil | Nil | Nil |
| Planar II | Nil | Nil | Nil | Nil | Nil | Nil | Nil |

([1]long = more than 20 mm)

The homeotropic film readily cracked, giving long cracks (in excess of 20 mm) and eventually producing a network of cracks covering the whole area of the slide. The planar film showed no cracking at all.

The homeotropic film on the planar film only started to crack after 476 hours, these being short cracks in the area where the film number was applied to the film with marker pen.

2B) Variation of amount of direactive compounds in homeotropic film
Polymerizable LC mixture 2B with an increased amount of direactive compounds was formulated as follows

| | |
| --- | --- |
| Monoreactive compound (1) | 32.67% |
| Monoreactive compound (2) | 18.67% |
| Direactive compound (3) | 21.00% |
| Direactive compound (5) | 21.00% |
| Dodecanol | 1.02% |
| BHT | 0.04% |
| Irgacure 907 ® | 5.60% |

(5)

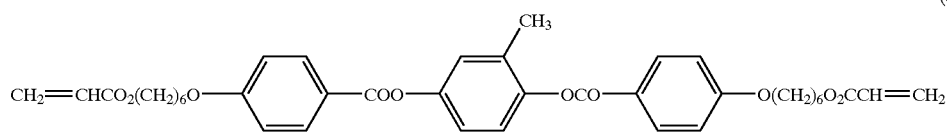

Glass slides (samples I+II) with homeotropic film were prepared from mixture 2B as described in example 2A. These were subjected to the same environmental conditions as before along with some slides (samples I+II) of the homeotropic film only. The results are shown in table 2 below.

TABLE 2

|  | Homeotropic + planar I | Homeotropic + planar II | Homeotropic only I | Homeotropic only II |
|---|---|---|---|---|
| 112 h | No cracks | No cracks | Many large[1] cracks | Many large cracks |
| 134 h | 1 large + several small | Small cracks | Many large cracks | Many large cracks |
| 282 h | Several large | 2 large + several small | Many large cracks | Many large cracks |
| 451 h | 6 large | 2 large + several small | Many large cracks | Many large cracks |
| 618 h | 8 large | 2 large + several small | Many large cracks | Many large cracks |
| 787 h | 8 large | 2 large + several small | Many large cracks | Many large cracks |
| 1026 h | 8 large | 2 large + several small | Many large cracks | Many large cracks |

([1]large = more than 20 mm)

A homeotropic LC film of mixture 2B with increased amount of direactive compounds, when coated onto the planar LC film, showed some increase in resistance to cracking, compared to when being prepared as a single film. However, the resistance is less than that of a homeotropic film prepared from mixture 1B with lower amount of direactive compounds.

Polymerizable homeotropic LC mixture formulations 2C–2G similar to 1B and 2B were formulated as shown in table 3.

TABLE 3

| Cpd./Mix. | 2B | 2C | 2D | 2E | 2F | 2G |
|---|---|---|---|---|---|---|
| 1(monor.) | 32.67% | 32% | 30.0% | 30.60% | 33.00% | 35.90% |
| 2(monor.) | 18.67% | 20.50% | 20.0% | 21.70% | 23.50% | 25.55% |
| 4(monor.) | — | 11% | — | 21.70% | 23.50% | 25.55% |
| 6(monor.) | — | — | 14.0% | — | — | — |
| 3(direact.) | 21% | 20.50% | 15.0% | 20.00% | 14.00% | 7.00% |
| 5(direact.) | 21% | 10% | 15.0% | — | — | — |
| Dodecanol | 1.02% | 0.50% | 0.50% | 0.50% | 0.50% | 0.50% |
| Irgacure 907 | 5.60% | 5.50% | 5.50% | 5.50% | 5.50% | 5.50% |
| % direact. | 42 | 30.5 | 30 | 20 | 14 | 7 |

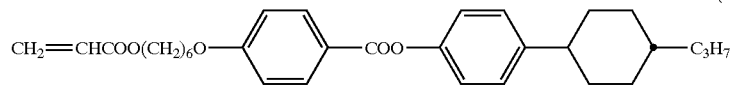

(6)

The monoreactive compound (6) is described in GB 2,280,445.

The polymerizable homeotropic LC mixture formulations 1B and 2B–2G were tested in the same way as described above. The results are summarized in table 4 below.

TABLE 4

| Mixture No | % Diacrylate | Survival Time (h) | Cracks visible at (h) |
|---|---|---|---|
| 2B | 42.0 | 112 | 136 |
| 2C | 30.5 | 235 | 402 |
| 2D | 30.0 | 235 | 402 |
| 1B | 20.1 | 476 | 645 |
| 2E | 20.0 | 402 | 809+ |
| 2F | 14.0 | 402 | 809+ |
| 2G | 7.0 | 402 | 809+ |

It can be seen that the resistance to cracking is related to the degree of crosslinking, represented by the percentage of direactive compounds in the polymerizable LC mixture.

Example 3

Control of Alignment in a Homeotropic LC Film
3A) Effect of the Different UV Lamps A normally hand coated planar LC film of mixture 1A as described in example 1 was cured on a Minicure hand-coating stage with 4 passes. Samples of the planar LC film were coated and given increasing numbers of passes. The homeotropic mixture 1B was coated on top of the planar layer. The response of the layer of mixture 1B is shown below. Samples which were given a lower exposure to the UV lamp resulted in a tilted film being produced. Increasing the UV exposure gave the required homeotropic alignment.

| No of passes | Effect |
|---|---|
| 4 | Tilted |
| 8 | Homeotropic |
| 12 | Homeotropic |

Similarly hand coated samples of the planar LC film of mixture 1A were attached to the RK Koater and subjected to different lamp powers.

| % lamp power | Intensity watts/cm² | Effect |
| --- | --- | --- |
| 30 | 0.72 | Tilted |
| 40 | 0.96 | Tilted |
| 50 | 1.01 | Tilted |
| 55 | 1.08 | Partially homeotropic |
| 60 | 1.25 | Homeotropic |

The planar LC film was produced on the RK Koater using 60% lamp power. A resultant film of mixture 1B coated on top of said planar film aligned homeotropically. The hand coated samples were passed through the Minicure stage 4 times, receiving an inadequate dose of UV radiation.

As a result, the amount of radiation received modifies the surface of the planar LC film, to influence the homeotropic alignment of an LC mixture coated onto said film.

3B) Homeotropic LC Film Prepared on Planar LC Film with Helically Twisted Structure

Preparation of Planar Aligned LC Film with Helically Twisted Structure

| Polymerizable LC mixture 3B was formulated as follows | |
| --- | --- |
| Monoreactive compound (1) | 32.7% |
| Monoreactive compound (2) | 18.8% |
| Direactive compound (3) | 42.0% |
| S-1011 | 0.4% |
| Irgacure 907 ® | 5.6% |
| Fluorad FC171 ® | 0.5% |

S-1011 is a commercially available chiral dopant (from Merck KGaA, Darmstadt, Germany).

An LC film with helically twisted structure and planar alignment (twisted A plate) was prepared from a 25% solution of mixture 3B as generally described above and in WO 01/20394A, using a TAC substrate and a RK Koater.

The retardation profile of the twisted A plate is shown in FIG. 3.

Preparation of Homeotropic LC Film on Planar LC Film with Helically Twisted Structure A 30% solution of mixture 1B was coated onto the above prepared twisted A plate by hand using a No 3 wire wound bar. The solvent was allowed to evaporate and the coating cured at room temperature with 4 passes through the Minicure at 20 m/min. A bilayer film of a homeotropic LC film on the twisted A plate was obtained. The resultant film was clear and well aligned.

The retardation profile of the combined homeotropic LC film and twisted A plate is shown in FIG. 4.

The on axis retardation value for the twisted A plate alone is 118.1 nm. For the combined films this value is 108.2 nm. The agreement on these figures indicates that the second LC film has aligned homeotropically.

3C) Splayed LC Film Prepared on a Planar LC Film

During the preparation of the homeotropic film on a planar film (example 1B) it was found that insufficient UV exposure, in this case 1.08 mW/cm², to the planar film resulted in a tilted or splayed film being produced instead of a homeotropically aligned film.

Preparation of Planar LC Film

The planar film was prepared using a method similar to the one described in example 1A. The mixture preparation and coating condition was identical to that described in 1A, and the film was cured under the same UV lamp, but the power was reduced to less than 50%.

The planar film was removed from the PET by lamination onto TAC with PSA so that the film retardation can be measured without interference from the birefringence of the PET. The retardation on axis was 162 nm.

Preparation of Splayed Film Directly on the Planar Film

Mixture 1B was prepared as described in example 1B and coated directly on top of the planar film prepared above in the same coating direction (CD). The solvent was allowed to evaporate and the resulting film was polymerized under a medium pressure Hg lamp. The bilayer film was transparent and was removed from the PET by lamination onto TAC with PSA so that the film retardation can be measured without interference from the birefringence of the PET. The retardation on axis was 230 nm and the profile in both CD and transverse direction (TD) is shown in FIG. 5.

Figure 1:
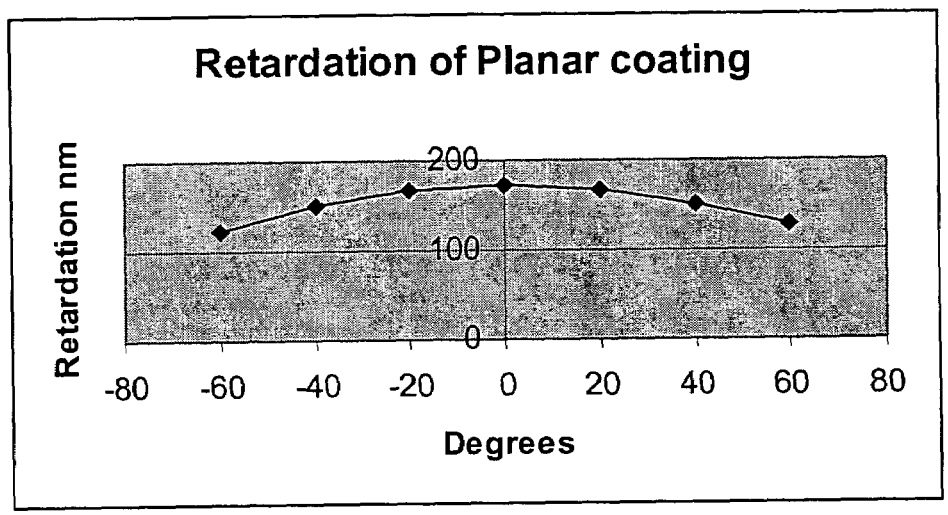
FIG. 1 shows the retardation profile of the planar film of Example 1A.
Figure 2:
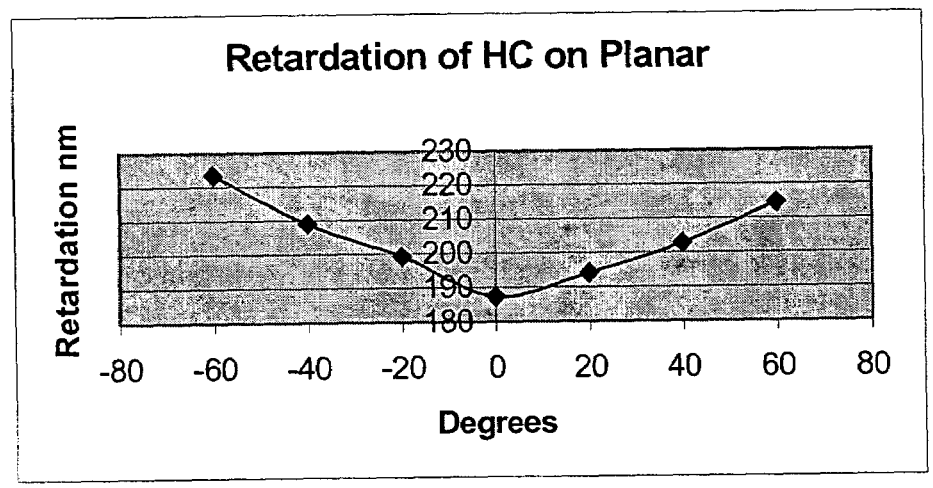
FIG. 2 shows the retardation profile of the Example 1 combined film.
Figure 3:
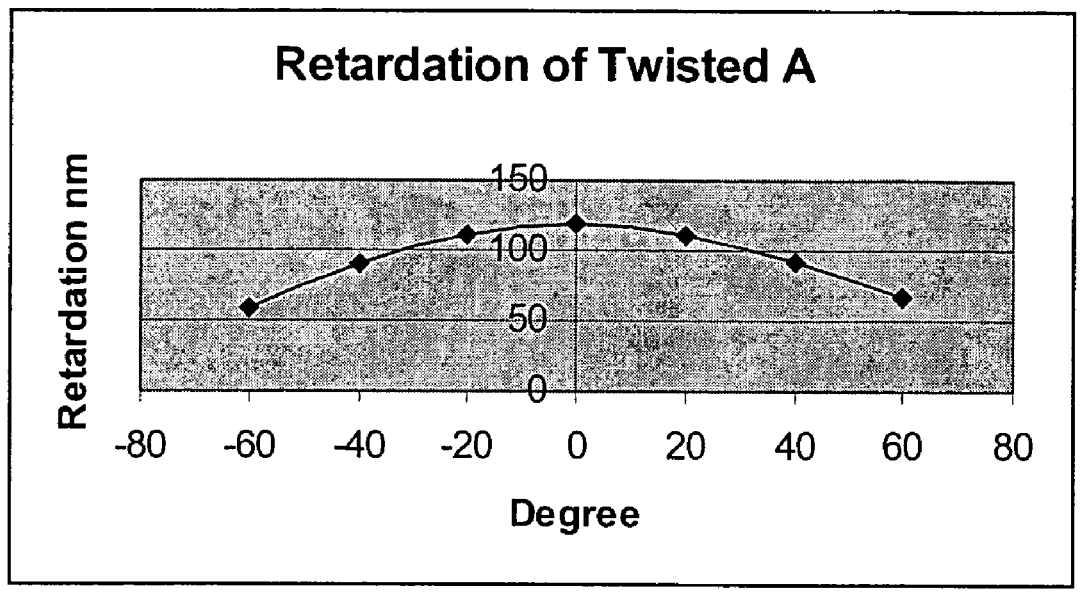
FIG. 3 shows the retardation profile of the twisted A plate of Example 3B.
Figure 4:
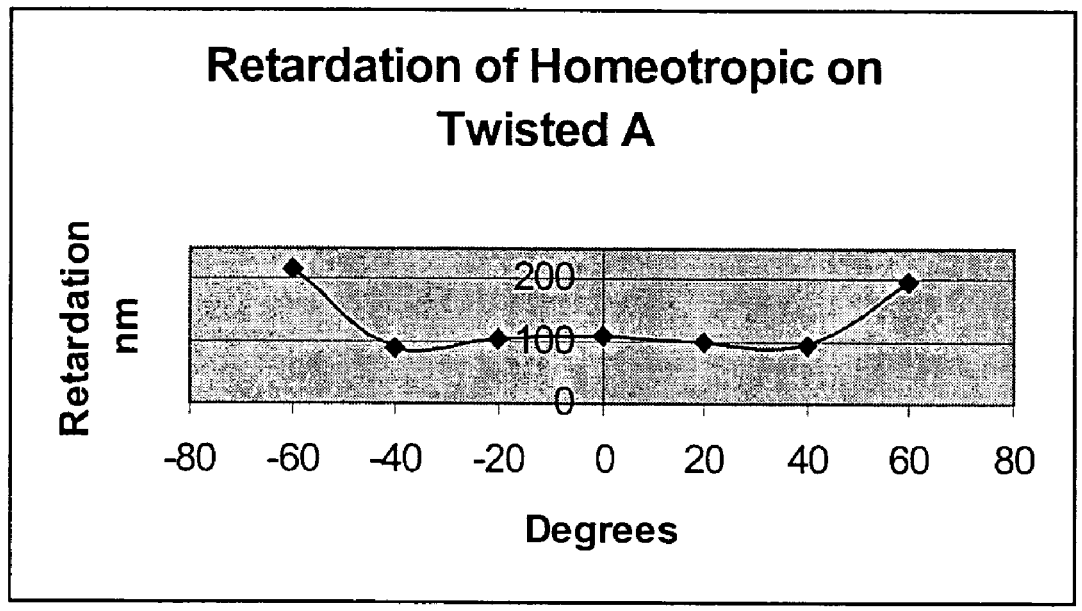
FIG. 4 shows the retardation profile of the combined homeotropic LC film and twisted A plate of Example 3B.
Figure 5:
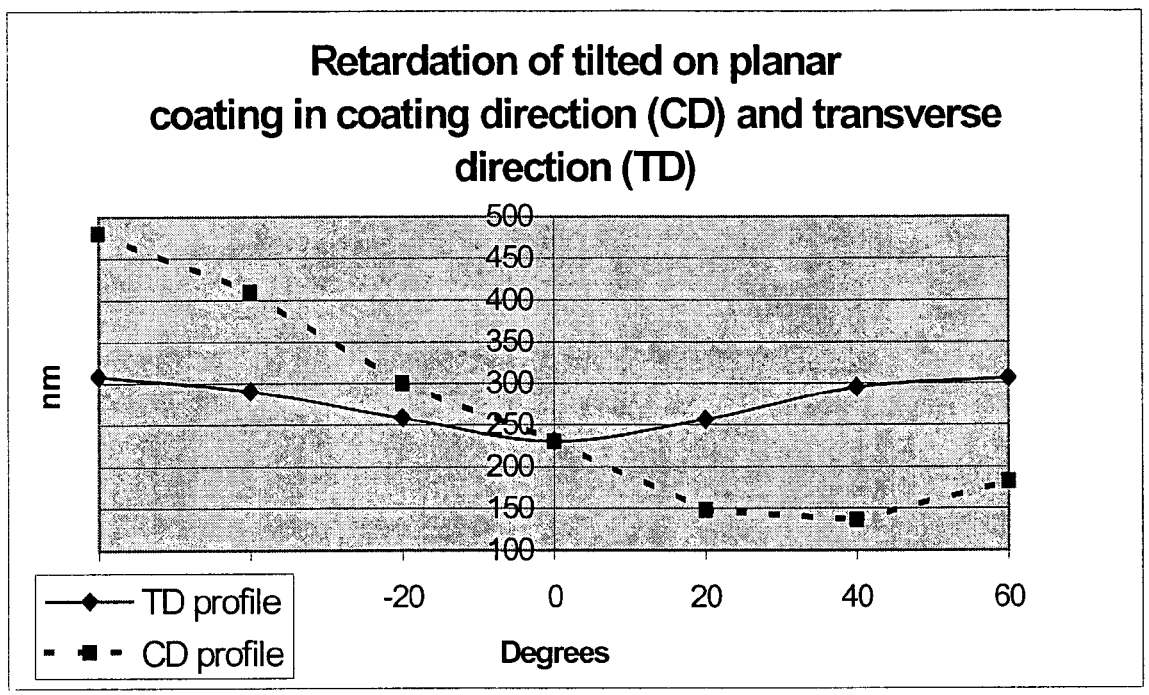
FIG. 5 shows the retardation profile in both CD and TD of the combined film of Example 3C.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A process for preparing a second film comprising a second polymerized liquid crystal (LC) material with uniform homeotropic, tilted or splayed orientation directly onto a first film comprising a first polymerized LC material with uniform planar orientation, which comprises providing a second polymerizable LC material directly onto said first film and polymerizing said second polymerizable LC material.

2. The process of claim 1, wherein the first polymerized LC material in said first film has helically twisted structure.

3. The process of claim 1, wherein the second polymerized LC material in said second film has homeotropic orientation.

4. The process of claim 1, wherein the second polymerized LC material in said second film has tilted or splayed orientation.

5. The process of claim 1, wherein said second polymerizable LC material comprises one or more polymerizable compounds having one polymerizable group and one or more polymerizable compounds having two or more polymerizable groups.

6. The process of claim 5, wherein said second polymerizable LC material comprises one or more compounds having two or more polymerizable groups in an amount of from 5 to less than 42% by weight of the total amount of solid components in the second polymerizable LC material.

7. The process of claim 1,
wherein said first film having planar orientation is prepared by providing a first polymerizable LC material onto a substrate, aligning it into planar orientation and polymerizing it by exposure to UV radiation, and
wherein the tilt angle in said second film having homeotropic, tilted or splayed orientation is varied dependent on the intensity of UV radiation used for polymerization of said first film having planar orientation.

8. The process of claim 7, wherein the intensity of UV radiation used for polymerizing said first film is less than 1.1 watt/cm².

9. A film comprising a polymerized LC material with homeotropic, tilted or splayed orientation, obtained by the process of claim 7.

10. An optical or electrooptical device comprising a film of claim 9.

11. A liquid crystal display comprising a film of claim 9.

12. A film of claim 9, wherein:
the first polymerized LC material is polymerized from a polymerizable material comprising a compound of one of the following formulae:

(Ia)

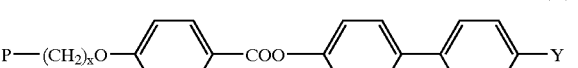
(Ib)

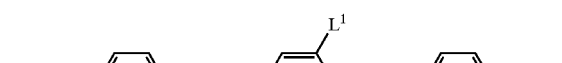
(Ic)

(Id)

wherein: P is a polymerizable group; x and y are each independently 1 to 12; A and D are 1,4-phenylene that is optionally mono-, di- or trisubstituted by $L^1$ or 1,4-cyclohexylene; u and v are 0 or 1; $Z^0$ is —COO—, —OCO—, —CH$_2$CH$_2$— or a single bond; Y is a polar group selected from F, Cl, CN, NO$_2$, OH, OCH$_3$, OCN, SCN, an optionally fluorinated carbonyl or carboxyl group with 1 to 4 C atoms or a mono-, oligo- or polyfluorinated alkyl or alkoxy group with 1 to 4 C atoms; $R^0$ is an unpolar alkyl group with 1 to 12 C atoms or alkoxy group with 2 to 12 C atoms; Ter is a terpenoid radical; Chol is a cholesteryl group; and $L^1$ and $L^2$ are each independently H, F, Cl, CN or an optionally halogenated alkyl, alkoxy, alkylcarbonyl, alkoxycarbonyl or alkoxycarbonyloxy group with 1 to 7 C atoms;

and/or, the second polymerized LC material is polymerized from a polymerizable material comprising a compound of one of the above formulae Ia to Iq.

13. A film of claim 9, wherein:
the second polymerized LC material is polymerized from a polymerizable material comprising:
5–41% weight of one or more direactive achiral mesogenic compounds,
49–90% by weight of one or more monoreactive achiral mesogenic compounds, and
0.1 to 10% by weight of one or more photoinitiators.

14. A compensation or retardation film comprising a film of claim 9.

15. The process of claim 1, wherein said second polymerizable LC material comprises one or more polymerizable compounds having one polymerizable group and one or more polymerizable compounds having two or more polymerizable groups, and wherein the mechanical stability of said second film is controlled and improved by varying the amount of multireactive compounds in said second polymerizable LC material.

16. The process of claim 15, wherein said second polymerizable LC material comprises one or more compounds having two or more polymerizable group in an amount of from 5 to less than 42% by weight of the total amount of solid components in the second polymerizable LC material.

17. A multilayer film obtained by the process of claim 1.

18. An optical or electrooptical device comprising a multilayer film of claim 17.

19. A liquid crystal display comprising a multilayer film of claim 17.

20. A multilayer film of claim 17, wherein:
the first polymerized LC material is polymerized from a polymerizable material comprising a compound of one of the following formulae:

(Ia)

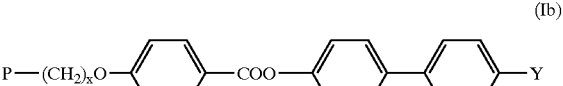
(Ib)

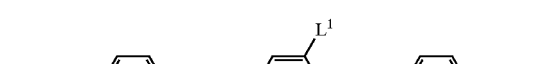
(Ic)

(Id)

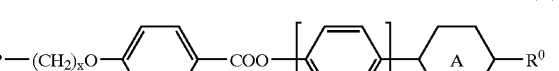
(Ie)

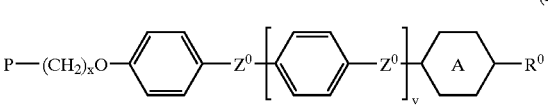
(If)

-continued

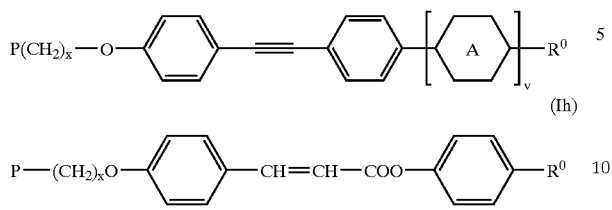

(Ig)

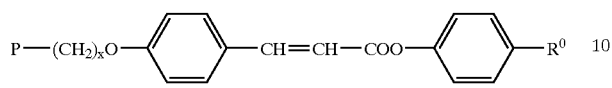

(Ih)

wherein: P is a polymerizable group; x and y are each independently 1 to 12; A and D are 1,4-phenylene that is optionally mono-, di- or trisubstituted by L or 1,4-cyclohexylene; u and v are 0 or 1; $Z^0$ is —COO—, —OCO—, —CH$_2$CH$_2$— or a single bond; Y is a polar group selected from F, Cl, CN, NO$_2$, OH, OCH$_3$, OCN, SCN, an optionally fluorinated carbonyl or carboxyl group with 1 to 4 C atoms or a mono-, oligo- or polyfluorinated alkyl or alkoxy group with 1 to 4 C atoms; $R^0$ is an unpolar alkyl group with 1 to 12 C atoms or alkoxy group with 2 to 12 C atoms; Ter is a terpenoid radical; Chol is a cholesteryl group; and $L^1$ and $L^2$ are each independently H, F, Cl, CN or an optionally halogenated alkyl, alkoxy, alkylcarbonyl, alkoxycarbonyl or alkoxycarbonyloxy group with 1 to 7 C atoms;

and/or, the second polymerized LC material is polymerized from a polymerizable material comprising a compound of one of the above formulae Ia to Iq.

21. A multilayer film of claim 17, wherein:
the second polymerized LC material is polymerized from a polymerizable material comprising:
  5–41% weight of one or more direactive achiral mesogenic compounds,
  49–90% by weight of one or more monoreactive achiral mesogenic compounds, and
  0.1 to 10% by weight of one or more photoinitiators.

22. A compensation or retardation film comprising a multilayer film of claim 17.

* * * * *